(12) United States Patent
Eardley et al.

(10) Patent No.: US 10,936,462 B1
(45) Date of Patent: Mar. 2, 2021

(54) SYSTEMS AND METHODS FOR REAL-TIME APPLICATION ANOMALY DETECTION AND CONFIGURATION

(71) Applicant: Split Software, Inc., Redwood City, CA (US)

(72) Inventors: Elizabeth Eardley, Scotland (GB); Henry Jewkes, Denver, CO (US); Sophie Harpur, Scotland (GB); Trevor Stuart, San Mateo, CA (US); Pierre-Alexandre Masse, Redwood City, CA (US); Patricio Echagüe, Redwood City, CA (US)

(73) Assignee: SPLIT SOFTWARE, INC., Redwood City, CA (US)

( * ) Notice: Subject to any disclaimer, the term of this patent is extended or adjusted under 35 U.S.C. 154(b) by 0 days.

(21) Appl. No.: 16/862,271

(22) Filed: Apr. 29, 2020

(51) Int. Cl.
  *G06F 11/30* (2006.01)
  *G06F 11/34* (2006.01)
  *G06F 11/32* (2006.01)
  *G06F 11/07* (2006.01)

(52) U.S. Cl.
  CPC ........ *G06F 11/3051* (2013.01); *G06F 11/076* (2013.01); *G06F 11/0772* (2013.01); *G06F 11/323* (2013.01); *G06F 11/3466* (2013.01)

(58) Field of Classification Search
  CPC ............... G06F 11/0793; G06F 11/302; G06F 11/3051; G06F 11/3616
  USPC ..................................................... 714/25, 26
  See application file for complete search history.

(56) References Cited

U.S. PATENT DOCUMENTS

| | | | |
|---|---|---|---|
| 10,282,248 B1* | 5/2019 | Gudka | G06F 11/0793 |
| 2015/0180744 A1* | 6/2015 | Joshi | H04L 43/0894 |
| | | | 709/224 |
| 2018/0004507 A1* | 1/2018 | Aijaz | G06F 8/71 |
| 2018/0239660 A1* | 8/2018 | Guha | G06F 11/0751 |
| 2018/0285246 A1* | 10/2018 | Tuttle | G06F 11/302 |

* cited by examiner

*Primary Examiner* — Chae M Ko
(74) *Attorney, Agent, or Firm* — Womble Bond Dickinson (US) LLP

(57) ABSTRACT

A method and apparatus for application anomaly detection and remediation is described. The method may include receiving a plurality of event tracking messages generated by configurable applications after a feature treatment is deployed to configurable applications running on a first set of end user systems, and associating the feature treatment with values of a metric from the event messages that are attributable to the feature treatment being executed by the one or more configurable applications. The method may also include determining an impact of the feature treatment on the degradation of the metric when compared to a control value of the metric determined from a second plurality of end user systems that are not exposed to the feature treatment. Then method may further include, in response to detecting the statistically significant degradation of the metric, performing one or more actions to remediate the undesired impact of the feature treatment on the execution of the application.

19 Claims, 9 Drawing Sheets

700

| Metric Definition | Alert Policy |

Select Desired Impact: Would you like this metric to increase or decrease? ← 702

[ decrease ▼ ]

Select Traffic Type: What traffic type would you like to measure this metric for? ← 704

[ user ▼ ]

Measure As: How would you like to measure this metric? ← 706

[ average of event values per user ▼ ]

[ page.load.time ▼ ]

Value Field: Would you like to use the default value or select an event property to be used as the value? ← 708

[ value (default) ▼ ]

Properties (optional): Define a property you would like to filter this event by: ← 710
⊕ Add properties

| Metric Definition | Alert Policy |

Name

Type your alert policy name ← 752

Description (optional)

Add a description for your alert policy ← 754

1st alert condition: How would you like to measure this metric?

Choose your environment: Where you want to be alerted on.

staging ▼

Set alert threshold:
Alert if degradation is more than a [relative difference ▼] of [　] % ← 756
compared to baseline treatment.

Define alert notification channel:
Send alert via email and notify  ☒ Metric owner
☐ Treatment owner
☐ Existing treatment users and groups
☐ Additional emails ⊕ Add alert condition

[ Cancel ]   [ Create Alert Policy ] ← 756

FIG. 7B

SYSTEMS AND METHODS FOR REAL-TIME APPLICATION ANOMALY DETECTION AND CONFIGURATION

TECHNICAL FIELD

Embodiments of the invention relate to the field of software application development and deployment, and more particularly, to detecting anomalies resulting from application updating.

BACKGROUND

Software applications, such as web page based applications, mobile device applications, desktop computer system applications, etc., are created by software developers. The software applications are then distributed to end users and run on end user computer systems (e.g., run on a user's personal computer, mobile computing device, served to a user from a web server, etc.). From usage of a software application, a developer may determine that changes to the application are necessary and/or desired for various reasons. For example, a software application may contain a bug causing the application to act in undesirable or unforeseen ways, and may even prevent the software application from running. As another example, a developer may want to change a user interface based on experiences and/or feedback of real world users of the application. As yet another example, a software application update intended to allow a real world user to improve service booking may appear to result in fewer service bookings. As yet another example, a new version of a web page may be intended to decrease page load time, when in fact it increases page load time. Thus, the effectiveness of the application in terms of operational performance and user experience may influence updates to the application.

Software applications, however, are becoming increasingly complex in terms of the number and characteristic of user interface elements, user interface layout, functional elements, options that may be deployed in an application, different deployments to various user groups, as well as other application implementation elements that may impact user experience with an application. Thus, measuring whether an update, potentially containing several new features (e.g., layout changes, feature changes, additional/new elements, etc.) and/or different version deployed to different groups (e.g., a mobile user group, a geographic user group, a specific customer base, etc.), is effective in terms of operational performance and/or user experience is also increasingly difficult. Furthermore, when multiple new and/or updated features are deployed in an application, it is difficult to tell which feature may be contributing to poor performance and/or a poor user experience.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 7A is one embodiment of an example graphical user interface generated by an application monitoring and configuration server for metric definition configuration for application anomaly detection.

FIG. 7B is one embodiment of an example graphical user interface generated by an application monitoring and configuration server for configuring alert policies for application anomaly detection.

DETAILED DESCRIPTION

Figure 1:
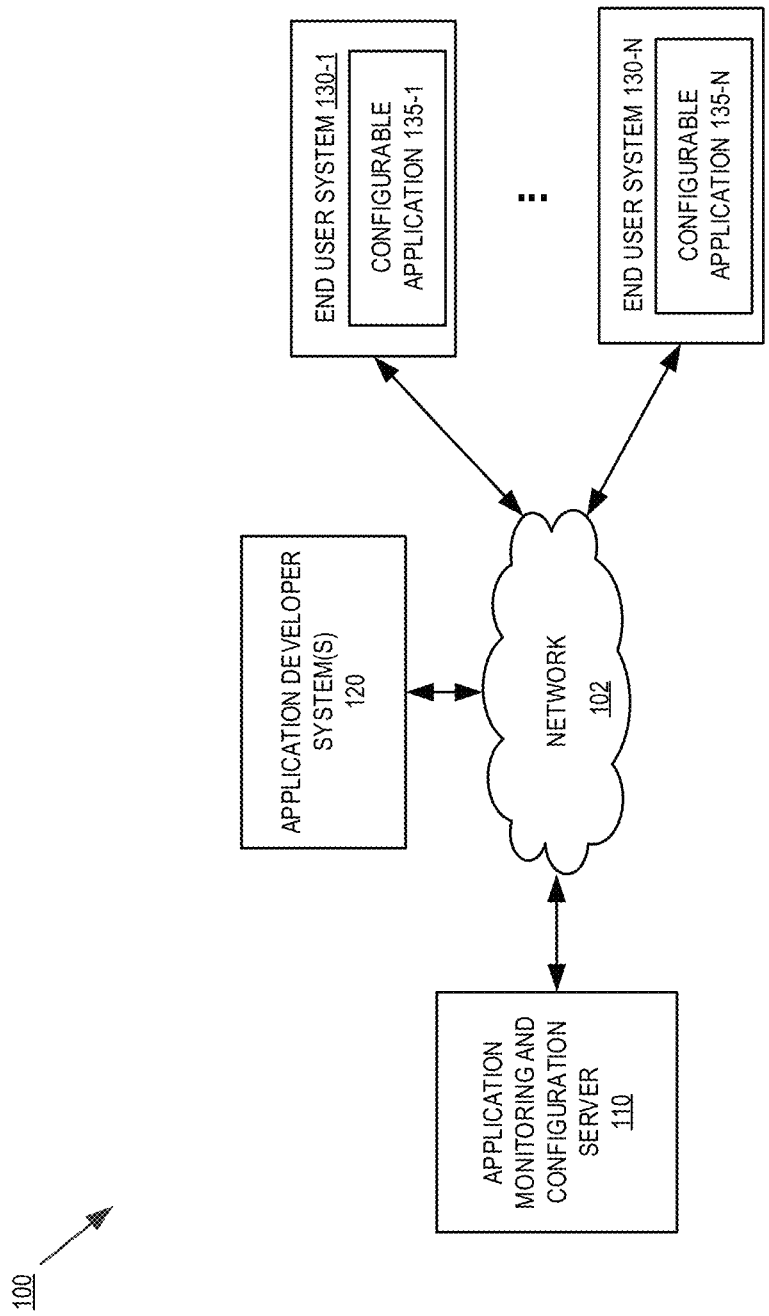
FIG. 1 is a block diagram of an exemplary system architecture for providing real time application anomaly detection and remediation.

In the following description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, in order to avoid obscuring the present invention.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving", "associating", "determining", "detecting", "generating", "transmitting", "performing", "deploying", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

FIG. 1 is a block diagram of an exemplary system architecture 100 for providing real time application anomaly detection and remediation.

In one embodiment, the system 100 includes a plurality of user systems, such as end user system 130-1 to user system 130-N, application monitoring and configuration server 110, and application developer system(s) 120. In one embodiment, end user system 130-1 to user system 130-N may be personal computing devices, such as a desktop computer, laptop computer, tablet computer, mobile computing device, mobile communication device, wearable devices, gaming devices, medical devices, or other computer systems upon which configurable applications may be run. The application monitoring and configuration server 110 and application developer system(s) 120 may also be computing devices, such as one or more server computers, desktop computers, etc.

The end user systems 130-1 through 130-N, application monitoring and configuration server 110, and application developer system(s) 120 may be coupled to a network 102 and communicate with one another using any of the standard protocols for the exchange of information. In embodiments, secure protocols for the exchange of information may also be used. In one embodiment, one or more of the end user systems 130-1 through 130-N, application monitoring and configuration server 110, and application developer system(s) 120 may run on one Local Area Network (LAN) and may be incorporated into the same physical or logical system, or different physical or logical systems. Alternatively, the end user systems 130-1 through 130-N, application monitoring and configuration server 110, and application developer system(s) 120 may reside on different LANs, wide area networks, cellular telephone networks, etc. that may be coupled together via the Internet but separated by firewalls, routers, and/or other network devices. In yet another configuration, the application monitoring and configuration server 110 and application developer system(s) 120 may reside on the same server, or different servers, coupled to other devices via a public network (e.g., the Internet) or a private network (e.g., LAN). It should be noted that various other network configurations can be used including, for example, hosted configurations, distributed configurations, centralized configurations, etc.

In one embodiment, end user systems 130-1 through 130-N execute applications, such as configurable applications 135-1 through 135-N. The configurable applications may include any type of software application such as an application downloaded to, installed on, and run on a user system, a web based application downloaded from a server computer system and run on a user system, a mobile application where the user system is a mobile device (e.g., tablet computer, laptop computer, mobile telephone, gaming device, medical device, etc.), as well as other types of software applications. Configurable applications 135-1 through 135-N may be configured at run time using application monitoring and configuration server 110 to control how one or more features are treated during execution of the application. For example, a feature may be turned on or turned off by application monitoring and configuration server 110 for execution by one or more user systems 130-1 through 130-N, such as activation of a user interface element, activation of an application capability, etc. As another example, a value may be set by application monitoring and configuration server 110 within an application that impacts how the application is executed by an end user system, such as specifying between different credit cards that can be accepted in a merchant user interface of the application, specifying a user group (e.g. based on device type, demographics, operating system, etc.) to receive a banner ad in a web page, as well as any other type of application configuration. As yet another example, appearance of a user interface may be altered by application monitoring and configuration server 110. In embodiments, the different real-time configurations of running applications are referred to herein as treatments, where a treatment configures one or more application features during the execution of software applications by end user systems. Furthermore, each of user systems 130-1 through 130-N may execute the same or different applications having the same and/or different treatments applied by application execution management server 110. For example, different subsets or populations of end user systems 130-1 through 130-N may have different treatments applied to their respective configurable applications 135-1 through 135-N during treatment efficacy experimentation, as discussed herein. For ease of discussion, and to avoid obscuring embodiments set forth herein, the remaining discussion will assume that the configurable applications 135-1 through 135-N are the same type of application even if they have different treatments being applied.

In one embodiment, configurable applications 135-1 through 135-N are prepared for management by application monitoring and configuration server 110 by a developer of the application, such as by a developer associated with application developer system(s) 120. In one embodiment, a user of application developer system(s) 120 includes a feature treatment logic within each application 135-1 through 135-N. Optionally, a user of application developer system(s) 120 may configure the application to communicate with a software development kit (SDK) (not shown) that is either within each application 135-1 through 135-N or remotely located at, for example, application developer system(s) 120, a web server (not shown) providing the application of developer system, etc. The SDK and documentation for inserting the feature treatment logic within the code of an application may be downloaded from application monitoring and configuration server 110. In embodiments, the SDK is a software development tool responsible for communicating with application monitoring and configuration server 110 on a periodic basis, such using functions and protocols defined by an application programming interface (API) of application monitoring and configuration server 110, for sending and receiving electronic messages over network 102 to enable acquiring definitions that enable the feature treatment logic with applications to select between configurable application features based on, for example, end user system identifiers, user identifiers, or other identifiers, and logic within the application's code for executing a feature specified in the acquired definitions and transmitting reports messages to application monitoring and configuration server 110. Application developer system(s) 120 insert the feature treatment logic into the applications to enable runtime configuration of application features, such as the ability to selectively enable features, selectively change execution of features, selectively turn features on/off, selectively change a user interface and/or the elements contained therein, etc. One embodiment of providing for and configuring the execution of applications with different treatment(s), selectively and in real time using feature treatment logic, is described more fully in U.S. patent application Ser. No. 15/198,498, titled "Systems and Methods for Providing Control of Application Execution", file on Jun. 30, 2016, which is incorporated herein by reference in its entirety.

In embodiments, application developer system(s) 120 may assign application(s) 135 and/or end user systems 130 with unique user identifiers, such as a user key. In embodiments, the user key(s) may be provided to application monitoring and configuration server 110 from application developer system(s) 120, so that application developer system(s) 120 can specify how to identify specific end users and then which end users are to receive which treatments. Furthermore, the user key maintains the privacy of users of the customer, as private and/or personally identifying information is not shared with application monitoring and configuration server 110.

In embodiments, application developer system(s) 120 may provide user attributes that are associated with user keys, for example in a user data store (e.g., user data store 216), such as age, geographic region, gender, income bracket, operating system, device type, etc. This enables application developer system(s)(s) 120 the ability to test software features at end user systems 130-1 through 130-N on a select basis, for example by activating a feature on a specific user (e.g., by user key), a select group of user systems (e.g., subsets or populations of user's having a specific attribute or combination of attributes), to roll out a feature in newly released applications slowly over a set period of time to select user groups and/or users of the same group, to turn off features that are not behaving as expected, etc.

In one embodiment, application developer system(s) 120 further insert event tracking method calls in one or more of configurable applications 135-1 through 135-N. In embodiments, the event tracking method calls may also be inserted into software executing on application developer system(s) 120 and/or external application developer systems (not shown), such as systems providing web based services software, customer resource management software systems, remote data warehouses, enterprise resource planning software systems, active policy management software systems, security information and event management software systems, and/or other software systems used by application developer system(s) 120 that provide software and/or services to end user system(s) 130-1 through 130-N. In embodiments, the method calls are provided by the API distributed by application monitoring and configuration server 110, which may be inserted into and executed by software applications 135-1 through 135-N, as well as applications executed by application developer system(s)(s) 120 and external application developer system(s) 140.

In one embodiment, event tracking method calls, when made, generate a message that includes at least a customer key (e.g., a customer identifier) that enables application monitoring and configuration server 110 to distinguish between different customers (e.g., corporation X and corporation Y), a user key (e.g., a traffic type that identifies one or more users and/or characteristics of users of the customer, such as specific user IDs, class of user, a type of account associated with the user, etc.), an event type that identifies the event being tracked, a value associated with a metric for the event (e.g., page load time, time on page, feature exposure, occurrence or non-occurrence of a booking, occurrence or non-occurrence of a sale, number of interactions with a feature, etc.), a timestamp indicative of when the event triggering the method call occurred, and, in some embodiments, a set of one or more optional properties like user location, gender, demographic information, and any other type of data that can be used to segregate or otherwise differentiate the set of these events at a later time for more fine granular analysis using the techniques discussed herein. For example, the event tracking method call may be triggered in response to a user clicking a buy button on a web based application, a booking is initiated in a mobile app, a user selects a credit card in an application, a user navigates to a specific web page, etc. (e.g., active events with respect to a user interacting with an application), and may also be triggered when a user leaves a specific page of an application or web application, time a frame in an application or web page is displayed, a method call in response to completion of a specific event (e.g., page load time), etc. (e.g., passive events with respect to a user's interactions with an application), where the track method call is included in the code for the application feature being tracked. In embodiments, the method call within the application generates a message including the above described information (e.g., customer key, user key, event type, and value of a metric (if applicable)) and is transmitted to application monitoring and configuration server 110. In one embodiment, the message may be encrypted or otherwise secured to obfuscate the information contained herein. However, as discussed herein, the identifiers do not reveal personal user information, and are instead used by application developer system 120 to associate with the customer's users.

One embodiment of the track events method call, may be a method call, such as track( ) defined in an SDK or API distributed by application monitoring and configuration server 110 and integrated into configurable applications 135-1 through 135-N, which may take four arguments. For example, the track( ) method call may be able to pass to application monitoring and configuration server 110 a customer_ID (e.g., an identifier that represents the customer system, such as an application developer system 120 that distributed configurable applications to end user systems), a traffic type (e.g., a string that represents an end user system and enables application developer system(s) 120 to identify specific users, groups of users, etc., such as a user ID, account ID, customer type including fee or paid, etc.), an event_type (e.g., a string that represents an event type corresponding to the event that resulted in the track( ) method call), and one or more value(s) (e.g., optional value(s) that may be defined to represent a value or metric to be tracked, which can be set to null or zero in the event application monitoring and configuration server are to count occurrences of an event, and/or which can represent user location, gender, demographic information, and any other type of data used for fine granular analysis of applications). Furthermore, the execution of the track( ) method call may also generate and attach a timestamp to the event message. For example, a track( ) method call may take the form of client.track("Customer_ID", "Trafic_Type", "Event_Type", Value), with example values of client.track ("john@doe.com", "user", "page_load_time", 83.3334). In embodiments, however, other fields/arguments may be used consistent with the discussion herein for tracking and describing events that occur in response to application of different application treatments.

In embodiments, when event tracking method calls are integrated into features of configurable application(s) 135-1 through 135-N, software running in application developer system(s) 120, and/or software running in external application developer system, application monitoring and configuration server 110 aggregates a plurality of received event messages, and stores the event messages in a data store (not illustrated) by customer key, user key, or any other key, along with the data (e.g. timestamps and other data) from the event messages that enable application monitoring and configuration server 110 to store, locate, and sort event information records. In embodiments, the event messages may be generated from method calls embedded within feature treatments that have been activated in a configurable application. However, event messages may also be generated from method calls in other software components or systems. For example, an event tracking message may be used within a feature's selected treatment to indicate when the user is accessing the treatment or a function within a treatment. As another example, a feature treatment may be designed to improve sales conversions, and the method call is associated with a buy button that is not part of the configurable aspects of the application. As yet another example, an external customer system (not shown), such as a customer relationship management (CRM) system, may use a track event method call when a new contact is added to the CRM system. As yet another example, an event tracking message may be generated automatically upon the occurrence of events by a configurable application, such as automatically generating messages with application metrics for page load time, time on page, error messages, etc., such as by using an agent, function, or other mechanism within the application or webpage based application. As discussed herein, even though one or more of the received event messages are not connected to the execution of the configurable application, they may be relevant to a developer system 120 when determining effectiveness of a treatment with an application. Therefore, the use of the track( ) method calls discussed herein enables the tracking and attribution of events from a more diverse set of systems to improve how relevant events are attributed to feature treatment application at one or more of end user systems 130.

In one embodiment, after aggregating the plurality of events from the various systems from the received event tracking messages, application monitoring and configuration server 110 performs event attribution on the collected corpus of reported events from end user systems(s) 130-1 through 130-N and other software systems that have integrated the tracking techniques discussed herein, where event attribution is described more fully in U.S. patent application Ser. No. 16/681,207, titled "Systems and Methods for Providing Event Attribution in Software Applications", file on Nov. 12, 2019, which is incorporated herein by reference in its entirety. In embodiments, event attribution links events (e.g., from event messages from any source system) with feature treatments applied in a configurable application. The link is established by the application monitoring and configuration server 110 using one or more of the customer key and/or user key, and time stamps in the event messages based on a time when a feature treatment is activated. That is, events (e.g., page load times, clicks, views, buys, feature treatment access, etc.) that occur after a user (e.g., an end user of one of end-user systems 130) received a treatment for a configurable application may be linked/attributed to the feature treatment. Furthermore, because feature treatments may be organized based on any number of end user attributes (e.g., one or more of age, geography, income bracket, user class, gender, profession, etc.), different sample sets or populations may be generated for deploying different feature treatments in different time periods to, for example, roll out features slowly, test feature treatments for specific user groups, etc. The attribution of events to feature treatments, and further based on sample sets, are then used by application monitoring and configuration server 110 to determine, using statistical inference, whether an event was influenced in a causal manner by a feature treatment based on the values and event types within the event messages from the different populations/subsets of end users. For example, activating a variant of feature treatment x resulted in a statistically higher sales conversion for users belonging to group y. As another example, activating a variant of feature treatment i resulted in a statistically longer page load time for users belonging to group j. As yet another example, an event triggered on an external system (not shown) is statistically more likely to happen for users in group a exposed to feature treatment b.

Figure 2A:
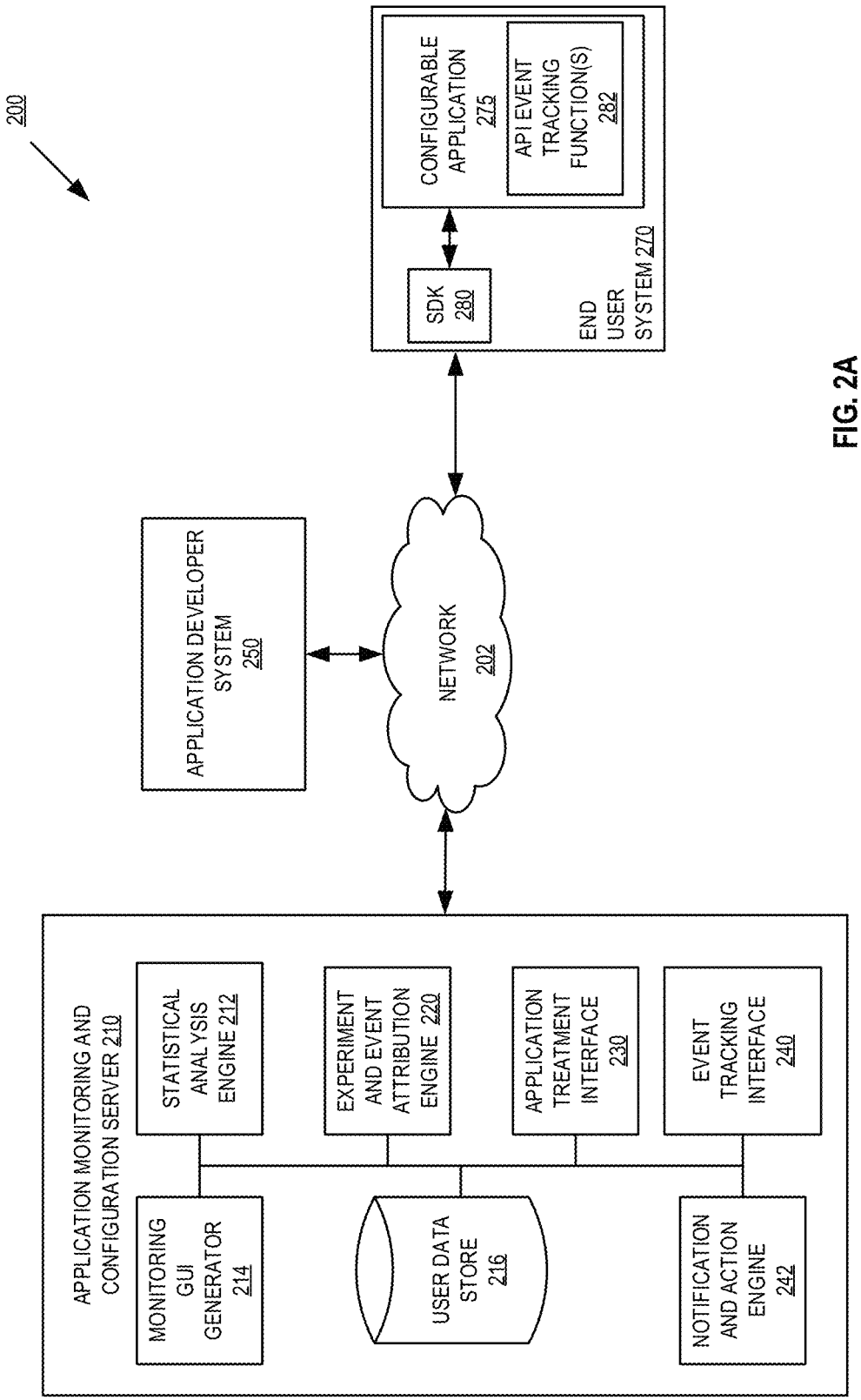
FIG. 2A is a block diagram of one embodiment of an application monitoring and configuration server, an application developer system, an external system, and an end user system.
Figure 2B:
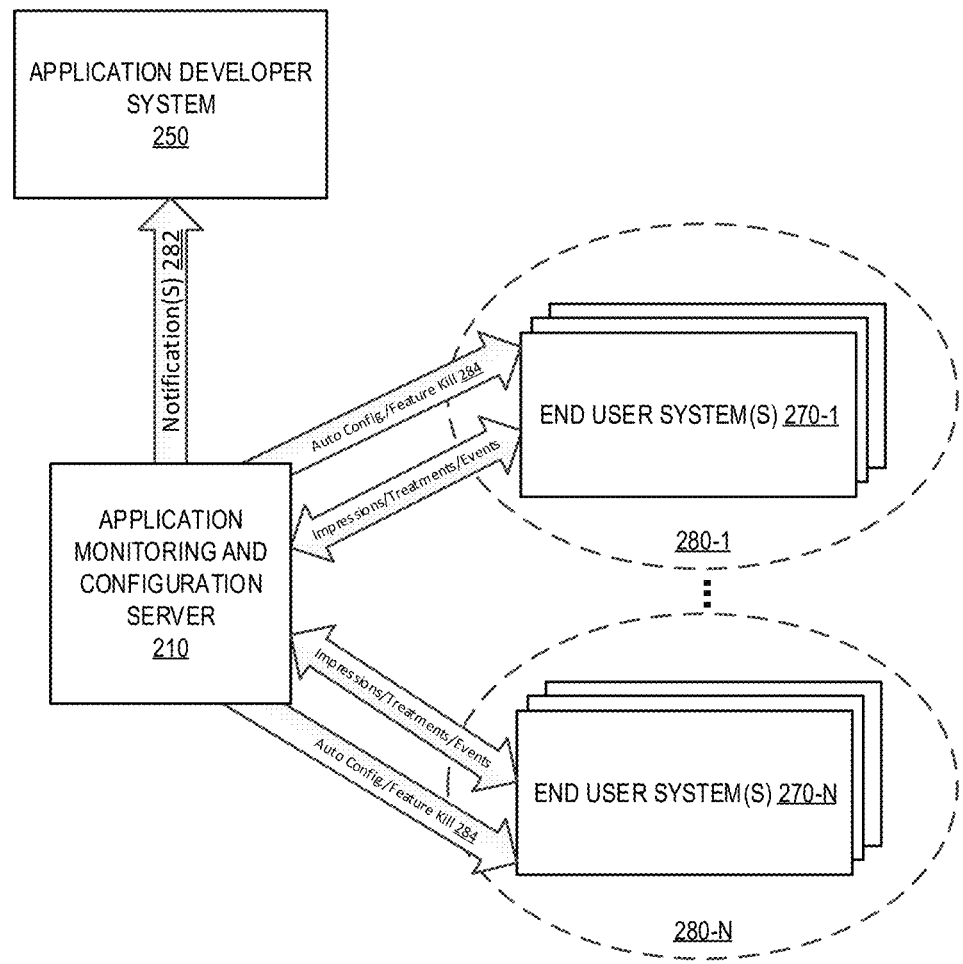
FIG. 2B is a block diagram of an exemplary system architecture for real time notifications and application configuration for updated applications.

For example, FIG. 2B illustrates end user system(s) 270-1 as part of sample set 280-1, which may receive for example, a first version of feature treatment or a first version of treatments to more than one feature. End user system(s) 270-N are part of sample set 280-N, which may receive a second version of feature treatment or a second version of treatments to more than one feature. The sample sets may be defined, by application developer system 250 and/or the application monitoring and configuration server 210, based on any combination of end user characteristics to test a newly developed and distributed software application, test feature treatment(s) on different sample populations, etc. The application monitoring and configuration server 210 may then distribute the same or different treatments to the end user systems 270 and receive event messages, as well as event messages from end user systems and external system(s) (not shown). These event messages, when attributed to the application of feature treatment to the different groups, may then be used to determine whether the treatments were influential in reaching a goal of application developer system 250 (e.g., by statistically analyzing one or more metrics collected from relevant event messages, and performing a rigorous statistical analysis to detect any causal relationship between the treatment applied and the metrics collected). For example, did the treatment have a causal effect on the likelihood of a sales event (e.g., clicking a buy button, adding a contact to a CRM system, etc.), page time event (e.g., a time on page measurement, page load time, etc.), etc.

In embodiments, the statistical analysis performed by application monitoring and configuration server 210 detects when the data is consistent, beyond a reasonable level of doubt as determined using the rigorous analysis techniques discussed herein, with an application not behaving as expected (e.g., page load time increases, sales conversion drops, total time on page decreases, etc.). Furthermore, the specific feature or feature causing the application's performance issue(s) is determined through a rigorous statistical analysis to ensure the proper feature is determined to be the cause of the application's poor performance. As will be discussed in greater detail herein, specific features, the metrics collected and measured for those features, how a metric is to be interpreted (e.g., direction of degradation of a metric), and the types of remediation (e.g., generation of alert notifications, defining who should receive such notifications, whether an application feature should be automatically rolled back to a baseline or prior treatment (e.g., "killed"), whether and how one or more external systems should be notified, whether and how one or more external systems are activated, etc.), may be defined by application developer system 250. Thus, application developer system 250 may define that in response to detecting statistically significant degradation of a metric being monitored for one or more features may generate notifications 282 and/or automatically configure/kill features 284 that are determined to be causing metric degradation. Furthermore, application monitoring and configuration server 210 and/or developer system 250 may adjust and/or re-define the sample sets based to execute orchestrated experiments, feature rollout, user system randomization for sample sets, etc.

Figure 8:
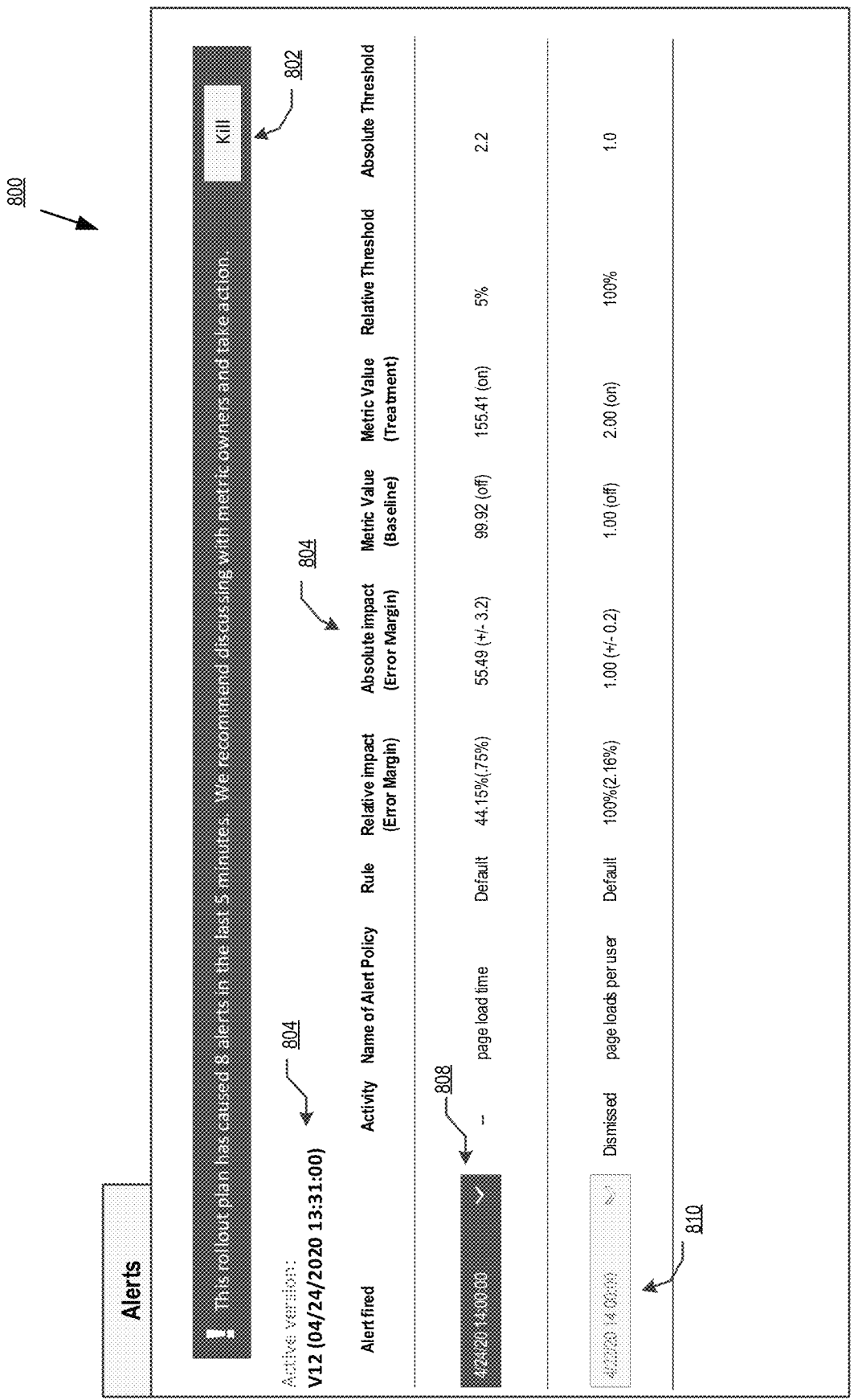
FIG. 8 is one embodiment of an example graphical user interface for alerts and application configurations generated by an application monitoring and configuration server in response to anomaly detection for an application.

Returning to FIG. 1, in one embodiment, the statistically significant degradation of a metric attributed to feature treatments, and further based on user sample sets, may be used to generate an alerts user interface (FIG. 8) and/or alert messages (e.g., email messages) for user of application developer system 120. The alert messages, as discussed herein, give early notice to application developer system(s) 120 when a feature treatment is having the opposite of a desired impact on the configurable application 130 at end user system(s) 130-1 through 130-N. Furthermore, the alerts, feature treatments, and metrics associated with the statistical analysis may be configured by a user of an application developer system 120, such as a developer user associated with a metric being monitored, associated with a feature generating the metric, a user group, or other specified individual(s). The configuration or metric analysis, alerting, and statistical analysis are discussed in greater detail below.

In one embodiment, because events include customer defined values and event types, the values and event types are typically associated with key performance measurements of the customer (e.g., sales conversions, service bookings, time on page, page load times, etc.). Therefore, the statistical evaluation of the event values for the relevant event types, and the determination that a feature treatment is determined to have an opposite of a desired effect rigorously determined to a statistical significance, which is based on the attribution performed by application monitoring and configuration server 110, enables application monitoring and configuration server 110 to generate alerts, suggestions to roll back (or kill) a feature deployment transmitted to relevant users of application developer system(s) 120, and/or automatically configure an application's treatment variations with respect to those key performance measurements, such as when it is determined that a metric is statistically likely to have degraded by at least a threshold amount. In one embodiment, alerts may be generated in messages (e.g. email, text, etc.), graphical user interfaces (e.g., FIG. 8), or a combination when metric degradation is detected by application monitoring and configuration server 110. Beneficially, the notifications, recommendations, and automatic application configuration are based on the specific features and metrics that are relevant to the customer system. In other words, feature level insights are used to determine what is impacting a metric of interest to a developer system 120. Application developer system(s) 120 may use the information to determine which versions (e.g., which treatment or collection of treatments), which specific features, etc. for an update to an application are failing to meet key performance goals at a granular level beyond mere knowledge that an application is not behaving as expected. The application developer system(s) 120 user(s) are then able to more quickly and more accurately address the issues causing unwanted application performance degradation.

In one embodiment, the statistically significant detection of a metric's degradation for feature treatments may also be used by application monitoring and configuration server 110 to actively configure additional end user systems. That is, when application monitoring and configuration server 110 detects that a feature treatment is statistically likely to be causing performance degradation by at least a threshold amount (e.g., page load time greater than 10%, page load time greater than 100 ms, page view decrease, sales conversion decease, etc.), in embodiments, application monitoring and configuration server 110 can proactively and automatically without intervention of a user of application developer system(s) 120 apply a baseline feature treatment (e.g., a treatment applied before the degradation, a treatment associated with a control group, etc.) that did not result in degradation of the metric. Additionally, external systems may be notified and/or configured based on the detected degradation, such as issuing commands or request notifications to activate a software development system bug tracking system (e.g., in response to an increase in page load errors), issuing commands or request notification to configure computing resources (e.g., in response to increased or decreased usage, requesting, commanding, or otherwise configuring server systems to appropriately decrease, increase, or other otherwise adjust allocated resources), etc. Therefore, real time testing and analysis enables application monitoring and configuration server 110 to determine in real time when an application feature is degrading key metrics set by a developer system 120, and further how to alert and automatically remedy the degradation with granular feature level insights.

In embodiments, the techniques discussed herein for detecting statistically significant degradation of a metric may also be employed to detect statistically significant improvement of a metric. As will be discussed in greater detail below, statistical techniques are employed that detect movement of a metric in a direction of degradation using one-tailed statistical analysis techniques. Similarly, the techniques can also be employed to detect movement of a metric in a developer defined direction of improvement. That is, when using a one-tailed statistical analysis as discussed below, a developer may specify for one or more metrics a direction of improvement (e.g., page load time decreases, sales conversion increases, time on page increases, etc.), and the techniques discussed below can be used to generate alerts, configure applications, notify and configure external systems, etc. in response to the detected improvements. For example, similar automatic configurations (e.g., automatic application configuration of additional applications beyond those in an initial application roll out may be performed in response to detection of improvements, automatic configuration of external systems such as provisioning additional server resources in response to detecting more system usage in response to a feature configuration, etc.) may also be performed consistent with the discussion herein. Although the embodiments discussed below focus on metric degradation to explain the analysis techniques for determining when it is statistically likely a change in a metric has occurred (i.e., metric degradation detection), the present application is not limited to only detecting metric degradation. Instead, the techniques discussed herein can be used to detect metric improvement, metric degradation or a combination thereof using the techniques, user interfaces, and processing logic discussed in greater detail below.

FIG. 2A is a block diagram of one embodiment 200 of an application monitoring and configuration server 210, an end user system 270, and an application developer system 250. The systems illustrated in FIG. 2A provide additional details for the systems discussed above in FIG. 1. Furthermore, although only one application developer system 250 and one end user system 270 are illustrated, any number of such systems may be used for event attribution and analysis as discussed herein, such as any number of different developer systems and their respective end user systems.

In one embodiment, application monitoring and configuration server 210 includes a statistical analysis engine 212 for performing statistical analysis on metrics collected from events that have been attributed to feature treatments for users/user groups. In embodiments, as discussed herein, the statistical analysis performed by statistical analysis engine 212 detects statistically relevant degradation of metrics to detect when an application is not behaving as expected and to further determine the specific feature and treatment resulting in the application's poor behavior.

Application monitoring and configuration server 210 further includes graphical user interface (GUI) generator 214 for generating user interfaces for configuration metrics and/or alerting policies, as well as for generating alert user interfaces, user data store 216 for storing events with associated event data and treatments/impressions data, experiment and event attribution engine 220 to define one or more user groups for receiving treatment variations and for attributing event messages from both end user systems and external systems to those treatment variations, application treatment interface 230 for distributing treatment configurations to end user system 270 as specified by application developer system 250 or based on an orchestrated experiment, event tracking interface 240 to distribute event tracking method call APIs and receive event messages for storage of the event messages and event message data in user data store 216, and notification and action engine 242 for generating notifications and/or automatically re-configuring configurable applications based on analysis results of the statistical analysis engine 212.

End user system 270 includes a configurable application 275 capable of receiving feature treatment configuration data and selectively applying feature treatments, an optional software development kit (SDK) 280 for receiving the feature treatments, and API event tracking functions 280 such as event tracking method calls (discussed above) defined by an API of application monitoring and configuration server 210. In embodiments, the method calls in API event tracking functions 282 may or may not be part of a configurable feature within application, as defined by a developer associated with application developer system 250 includes the method calls within the application.

External application developer systems (not shown), such as a data warehouse, CRM system, policy system, etc., may also include API event tracking functions that a developer has associated with application developer system and has included the method calls for generating event messages within the application being executed at external application developer system Application developer system 250, in embodiments, distributes the configurable application 275 to end user system 270 directly, or through a third party (not shown) such as an application store. Furthermore, after configurable applications are distributed to end user systems, a user of application developer system 250 may define, using application identifiers, customer keys, user keys, etc. which treatments are to be applied to which features in configurable application 275. Furthermore, a user of application developer system 250 may specify an experiment (e.g., define user groups and associated treatments, a timeframe for an experiment including start time and duration, etc.), and set up an orchestrated experiment (e.g., timed rollout of a feature to members of a user group or user class).

In one embodiment, monitoring GUI generator 214 further generates one or more user interface enabling application developer system 250 to define metrics to be monitored during experiments (e.g., feature and/or application rollout to specified users, user groups, etc.), alert policies that define when alerts should be received on features causing metric degradation, suggestions for application configuration (e.g., feature rollback, feature updating to a control group, feature killing, etc.), and definition of when an automatic application configuration may occur. In an embodiment, GUI generator 214 may generate GUI 700 illustrated in FIG. 7A, and transmit it to a user of application developer system 250. Within the GUI 700, the user may configure a metric to be monitored by statistical analysis engine 212. For example, the desired metric effect of a feature may be specified, such as the page load time should decrease 702, which indicates to statistical analysis engine 212 that movement of the metric in the opposite direction (e.g. page load time increases) is an undesirable impact on the application. In an embodiment, the opposite effect will therefore be monitored by statistical analysis engine 212. Furthermore, in GUI 700, the traffic type to measure 704 the metric is defined, such as users, specific user groups, operating systems, device types, etc. Additionally, how the metric is measured 706 may be configured, such as for page load times, the average time per user is measured. Additional configurations, such as configuring the value used in the measurement 708 may be specified (e.g., default, a specific value type, a range of values, etc.). As discussed herein, various metrics and metric types (e.g., event occurrence counts, time on page, page or application error counts, etc.) may be configured via interfaces generated by monitoring GUI generator 212, similar to the discussion above, and subsequently metrics collected by application monitoring and configuration server.

For a metric being configured, monitoring GUI generator 214 may also generate an alerts policy user interface 750 as illustrated in FIG. 7B. The alerts policy interface 750 enables a user of developer system 250 to define how an alerts policy is configured, such as enabling the naming and describing of a policy, enabling the definition of when a statistically relevant degradation of a metric is detected, and who are the user(s) associated with developer system (e.g., developer(s) associated with the configurable application 275, developer(s) associated with a feature associated with the metric, developers that manage the metric, specific user groups, etc.) that should receive notifications in response to the analysis described herein. In an embodiment, an alert policy may be defined for the metric configured in GUI 700, by specifying a name of the policy 752, an optional description of the alert policy 754, and various alerting conditions 756. The alerting conditions 756 enable the specification of where an alert should be generated, the alerting threshold being monitored for a metric (e.g., the size of the degradation being monitored, such as for a page load time metric, an alert condition may specify an alert/automatic configuration should be activated when a relative degradation size (e.g., page load time increased by 20%) or absolute degradation (e.g., page load time increased by 100 ms) of the metric value is detected), and the alertees (e.g., metric owners, treatment owners, other users/user groups, additional emails, etc.). Furthermore, additional alert conditions may be specified for the metric, as well as other metrics. In one embodiment, not only is degradation of a specific size (e.g. an alerting threshold), but an additional level of confidence required to declare statistical significance is configured for each alert policy, such as a 90%, 95%, 99%, etc. likely that a detected degradation can be attributed to a treatment (discussed in greater detail below), or put another way a 10%, 5%, 1% chance that the detected degradation meeting the threshold amount is incorrectly attributed.

In one embodiment, the additional alert condition(s) may include automatic application configuration conditions, which are configurable by a user of a developer system as discussed above by defining a name, description (optional), and the conditions associated with automatic configuration. In embodiments, for example, a larger alert threshold associated with a larger degradation size may be specified for automatic configuration (e.g., alert messages generated at 5% degradation, and feature rollback/killing performed at 20% degradation), a time period upon which an alert message should be handled before feature rollback/killing (e.g., in response to sending alert notification, if not dismissed within 24 hours, rollback/kill the feature), as well as other conditions for automatic application configuration. In embodiments, statistical significance may also be configured for taking automatic actions, such as when it is 90% likely that a metric degradation is correct an alert is generated, but when it is 99% likely that a metric degradation is correct an automatic re-configuration is performed. In embodiments, a combination of different alerting thresholds and confidence levels could be used for alert notifications and automatic application re-configurations. The alert policy(s) may then be created 756, which are stored by application monitoring and configuration server 210 within user data store 216, and later used by statistical analysis engine 212, as discussed in greater detail below.

In one embodiment, event tracking API manager and interface 240 of application monitoring and configuration server 210 may receive event messages on an ongoing basis, and stores the relevant data (e.g., customer key, user key, event type, value, timestamp, etc.) in user data store 216. Then, based on experiment parameters defined by application developer system 250, application treatment interface 230 may distribute feature treatments to associated user(s)/group(s) (e.g., users in a specific region have a specific treatment applied, users of a certain age have a specific treatment applied, users with certain device types may have a specific treatment applied, etc.), and collects event messages. Experiment and event attribution engine 220 then accesses the user data store to obtain event message data associated with the customer key and user key (e.g., event messages associated with application developer system 250, and the end users of that developer including end user system 270).

As discussed below, experiment and event attribution engine 220 may perform event attribution for some events, exclude some users from an experiment, update a version of an experiment, and set a window of time for the experiment (e.g., automatically or based on application developer system input). As discussed herein, application monitoring and configuration server 210 is able to consume event data from any source (e.g., one or more end user systems, external application developer system(s), etc.) so long as the event captured in an event message can be associated with a customer key, traffic/user key, and timestamp. Thus, application monitoring and configuration server 210 allows application developer system(s) and configurable applications to send application monitoring and configuration server 210 data from any source, for automatically identifying the sample population of an experiment, application deployment, etc., and using experiment and event attribution engine 220 to intelligently attribute events to each sample based on targeting rule (e.g., how a user is identified for a treatment) and treatment (e.g., application of the treatment to the identified user).

In embodiments, experiment and event attribution engine 220 combines received event data with the user keys to determine whether the event may have been influenced by a treatment applied to configurable application 275, based on whether the event occurred after the end user system was exposed to the treatment. Furthermore, the event messages, as discussed herein, may include a value associated with an event type that is relevant to the metric defined by a developer (e.g., in GUI 700) for the event type (e.g., an impact of a particular treatment) compared to a baseline treatment (e.g., values from event messages from another subset of users, for example, those without the treatment applied or a different treatment applied). Experiment and event attribution engine 220 then attributes metrics to feature treatments from the event messages in user data store 216, where event attribution is described more fully in U.S. patent application Ser. No. 16/681,207, titled "Systems and Methods for Providing Event Attribution in Software Applications", file on Nov. 12, 2019, which is incorporated herein by reference in its entirety.

In embodiments, based on the attribution discussed above, experiment and event attribution engine 220 stores the attribution of event messages to treatments, and the metrics reported in those event messages, in user data store 216 for experiments, application rollout, etc. Statistical analysis engine 212 accesses the data store to perform a statistical analysis of the metrics for a defined group as compared to a control group to detect degradation of the metric by a threshold amount (e.g., the threshold defined by the developer in FIG. 7B).

In one embodiment, statistical analysis engine 212 correlates the metrics from defined user groups to the treatments they have received via the analysis by event attribution engine 220. For example, statistical analysis engine 212 is able to determine which users received a treatment change (e.g. an experiment population, a rollout population, etc.), and which did not (e.g. control users or control population). Then, statistically consistent sets of users (e.g., groups sharing similar characteristics) may be compared during metric analysis to determine impact of the treatment change, such as users with corresponding demographic information (e.g., age, geography, user device type, operating system, or other demographic information) and which were exposed to treatment variations of a feature for which the metric is being collected. In other words, an apples to apples comparison is being performed by statistical analysis engine 212 to obtain relevant metric analysis results.

In one embodiment, statistical analysis engine 212 performs a one-tailed statistical analysis to detect the degradation of a metric (e.g., page load time) by a certain amount (e.g., the alerting threshold configured by a user system) in a population such that the degradation is statistically likely to have occurred in the direction opposite of a desired effect. For example, the developer defined confidence (90%, 95%, 99%, etc.) discussed above indicates in the one-tailed statistical analysis that a detected metric degradation is only 10%, 5%, 1%, etc. likely attributable to an incorrect conclusion in degradation. In statistical analysis terms for the one tailed test performed by the statistical analysis engine, a null hypothesis being tested is that the metric is within the threshold set by the developer system, an alternative hypothesis is that the metric exceeds the threshold in the direction of degradation, and a maximum acceptable error rate is set as the 10%, 5%, 1%, etc. value when disproving the null hypothesis. In embodiments, the one-tailed test is performed by the statistical analysis engine 212 because degradation generally matters for alerting purposes in one direction (e.g., page load time decreasing is a good result of a feature treatment, and page load time increasing is a negative result of a feature treatment for which alerts and application configuration should be performed to avoid negative end-user experiences). Furthermore, by using the one-tailed test, the statistical significance of the degradation is detectable sooner than a two-tailed test, leading to faster application anomaly detection, alerting, and remediation, thereby reducing a total number of end users exposed to a poorly performing treatment variation before alerting and automatic configurations may be performed. The specific type of one-tailed test performed by statistical analysis engine 212 can depend on the characteristics of the metric being evaluated. For example, for continuous valued metrics (e.g., event occurrence counts, time on page, page or application error counts, etc.) where it is determined appropriate to assume normally distributed errors, the specific one-tailed test used by statistical analysis engine 212 may be a t-test. For metrics measuring whether or not a particular event occurred (e.g., the proportion of users who saw a particular error, the proportion of users who made a purchase, etc.) where the metric can be assumed to follow a binomial distribution, the specific one-tailed test used by statistical analysis engine 212 may be a z-test. In one embodiment, when it is not possible to make any assumptions about the distribution of the metric, a one-tailed non-parametric test (e.g., Mann-Whitney U test) may be used.

In embodiments, the developer system 250 is able to configure the parameters of the one-tailed test performed by statistical analysis engine 212. That is, the confidence defined by the customer, in embodiments, is used by the statistical analysis engine 212 to configure the p-value threshold for the one tailed test (e.g., developer defined confidence of 95% sets a p-value threshold in the one-tailed test of 0.05 giving a type one error rate, which is the chance of falsely rejecting the null hypothesis, of 5%). Then, for the one-tailed test, the statistical analysis engine can set a null hypothesis as impact not satisfying the alerting threshold (e.g., page load time attributed to a treatment variation is the same or less than baseline page load time and/or page load time with an absolute or relative degradation amount equal to the developer defined acceptable threshold), an alternative hypothesis is set as the metric exceeding the threshold defined by a developer in the defined direction of degradation (e.g., FIG. 7B). Then statistical analysis engine is able to determine when an alert is to be generated by disproving the null hypothesis with a chance of error no more than the p-value threshold. That is, for a given metric, an alert and/or automatic application configuration is performed when metric degradation is detected, the degradation satisfies a threshold (e.g. one or more developer defined threshold(s)), and the degradation is statistically unlikely to be incorrectly attributed (e.g., no more than 5% chance that the detected degradation is attributable incorrectly to the treatment and the degradation).

Furthermore, in embodiments, the populations and metric reporting used by the statistical analysis engine 212 are determined by the events attributed by event attribution engine 220 for users who have been exposed to a relevant treatment/feature, and not merely aggregated results. That is, the statistical analysis engine 212 uses the end users and their reported metrics who have been exposed to a relevant feature/treatment and share statistically relevant demographic information. This provides for a more accurate, relevant, and timely degradation determination for alerting and automatic application configuration.

For example, suppose that a new search feature is to be tested in an application, and the new search feature is deployed to half of a developer's end users (e.g., 50% receive the new feature/treatment for search, and 50% are control users using an original feature/treatment for search). Then suppose that only 10% of application users actually use the search feature. If merely aggregating results for metric analysis, only 5% of users in the aggregated results would be exposed to the new search feature. Even if all of those users were to experience an error message, page load time increase greater than a set threshold, etc., then only 5% more of the aggregated users would experience the metric degradation. In contrast, statistical analysis engine 212 relying on attributed events looks to a feature-specific analysis based on relevant user groups (e.g., those exposed to the feature being tested). Thus, if the new search feature results in a 40% error rate, this error rate increase attributable to that feature is surfaced, and alerts and/or automatic application configurations can be triggered based on the one-tailed test analysis. However, an aggregated approach considering populations without considering treatment variation, event attribution, and/or relevant populations, would only see a 2% error rate increase, which at best would result in a greatly delayed alerting, and more likely would not result in any alerting or automatic application configuration. The example above illustrates the decreased time to metric determination enabled by the statistical analysis engine's 212 one-tailed statistical analysis using event attribution. Furthermore, the above example and the techniques discussed herein, further illustrate the detection of causation to the metric degradation (e.g., error rate was attributed to new search feature exposure, and not for example to a page layout variation), which provides fast and granular feature-level insights into what is causing application degradation of key performance metrics.

Furthermore, in embodiments, statistical analysis performs periodic analysis of the event data in user data store 216. In embodiments, an initial analysis is performed at time $t_1$, then at time $t_2$, and so on to time $t_n$. In embodiments, the interval between times $t_i$ and $t_{i+1}$ increases with the number of statistical analysis performed. That is, for example, an initial one-tailed analysis may be performed 30 seconds after a feature treatment is deployed or rolled out, then at 1 minute, 2 minutes, 5 minutes, 30 minutes, 1 hour, 4 hours, 12 hours, and finally at 24 hours. This is an example of increasing periods between analysis performed by statistical analysis engine 212. In one embodiment, increasing periods are used by statistical analysis engine 212 to preserve computing resources at server 210, while at the same time ensuring that statistical error does not accumulate at too high a rate (e.g., the more analyses performed, the more statistical error may accumulate within the results). In an embodiment, a set number of one-tailed analyses may be performed, and the p-value threshold used for each individual analysis is configured based on the desired overall confidence level (e.g. developer set confidence threshold) and the set number of analyses configured for the test, to ensure that the accumulated error is not greater than that specified by the desired overall confidence level. Furthermore, by performing periodic analyses with the periods being smaller initially ensures the fast detection of the largest metric degradations. Additionally, the period for testing for metric degradation automatically uses a control group (e.g., those not having a new feature treatment variation), which ensures that the comparison of metrics generated by those exposed to a feature treatment variation is compared to a current baseline of users not exposed to the new treatment variation. As a result, an accurate baseline value may be used by statistical analysis engine 212, and not an arbitrary baseline set by a developer.

Upon detecting a metric has degraded by an amount that satisfies an alerting/configuration threshold with a statistically significant likelihood, notification and action engine 242 is informed to generate one or more alerts based on the alerting policies (e.g. those defined in FIG. 7B). In one embodiment, the alerts may be embodied in test, email, voice, commercial instant messaging system, commercial social network system, or other message(s) generated by monitoring GUI generator 214 that identifies the feature, treatment, threshold, degradation amount, degradation percentage, detection time, likelihood of error etc. Furthermore, the email, instant message, etc. may contain a link to a graphical user interface served by application monitoring and configuration server 210, such as the example alerts user interface illustrated in FIG. 8.

Graphical user interface 800 illustrates a "kill switch" 802 that enables an application feature variation, for which a degradation satisfying a threshold with a statistically significant likelihood has been determined, to be turned off, reverted to a prior version, reverted to a baseline version, etc. More specifically, in response to the kill switch 802 selection, application treatment interface 230 may send applications within a test or rollout population feature treatment configurations to change the treatment of a feature associated with the degradation. Furthermore, in embodiments, the rolling back or killing of a feature treatment variation may be automatically performed by application treatment interface 230, such as when alerts are not acknowledged/dismissed within a pre-set amount of time, when a degradation is detected above a preset or developer configured alerting policy threshold (e.g., degradation of 20% or more), when a confidence interval satisfies a preset or developer configured confidence (e.g., degradation p-value of 1% disproves the null hypothesis, resulting in 99% confidence in degradation determination), etc., as well as combination of the aforementioned factors. In the automatic action embodiments or the developer selected configuration embodiments, application monitoring and configuration server 210 reverting a treatment variation to a baseline enables the minimization of potential users that could be exposed to a feature that is not performing as expected, and more quickly, and with less error, than would be revealed (if at all) by two-tailed and/or aggregation based analysis.

Furthermore, graphical user interface 800 provides a user of developer system information regarding each alert. For example, an application version is identified 804, and specific alerts (e.g., alert 808 and 810) are included. The alerts can include any activity associated with alerts, such as dismissal of a page loads per user alert 810, and the outstanding page load time alert 808. The rule applied to the alerts, alert policy name, metric impact within a version (absolute and relative), metric value of a baseline treatment, metric value of the treatment variation, a likelihood of incorrect attribution (e.g. p-value), and an absolute threshold may be included for each alert, as well as alerts with more or less information according to the event messaging analysis discussed above.

Furthermore, and as discussed herein, action engine 242 may also utilize the statistical analysis and one or more automatic action rules to automatically adjust configurations of configurable applications at end user's systems (e.g., end user system 270). For example, in response to detecting a metric degradation satisfying an automatic action threshold (e.g., defined by a user of a developer system or a default of server 210), notification and action engine may automatically cause application treatment interface to reconfigure a misbehaving treatment (e.g., the treatment determined to be causing a metric degradation). The automatic configuration, when made, may be done to revert an application feature treatment variation to a prior state, a baseline configuration, or other safe configuration. In embodiments, a rule with which action engine 242 automatically configures an application with a safe (baseline) treatment based on statistical significance of metric degradation determination can be defined by application developer system 250, such as via graphical user interface 750, generated by monitoring and GUI generator 214 and illustrated in FIG. 7b, in an alert policy.

Furthermore, based on detected metric degradation (and in some embodiments improvement), action engine 242 may message or otherwise configure external systems based on alerting policies defined by a developer to cause an external system (e.g., not the configurable application itself) to perform one or more actions such as tracking events via third party systems (e.g., recording bug reports at a software development system), allocating or deallocating resources (e.g., adding servers for increased traffic or removing servers when an application is more efficient), as well as configuring other systems defined by a developer system that are used with and/or to develop configurable applications.

In embodiments, the execution and performance by the remote end user systems (e.g., end user system 270) is improved with respect to metric of interest as defined by developer systems 250. More specifically, the statistical analysis performed by application monitoring and configuration server 210 enables the detection of metric degradation satisfying a developer set threshold with a statistical significance that the degradation is not being wrongly attributed to an incorrect determination (e.g., that the metric is not degraded by the threshold amount). This determination by the statistical analysis engine is performed on statistically relevant populations, and not merely an aggregation of results across all users to ensure fast, more accurate, granular, feature level degradation determinations. This in turn enables faster notifications and automatic application configurations, which ensures less end users are exposed to underperforming feature variations.

Figure 3:
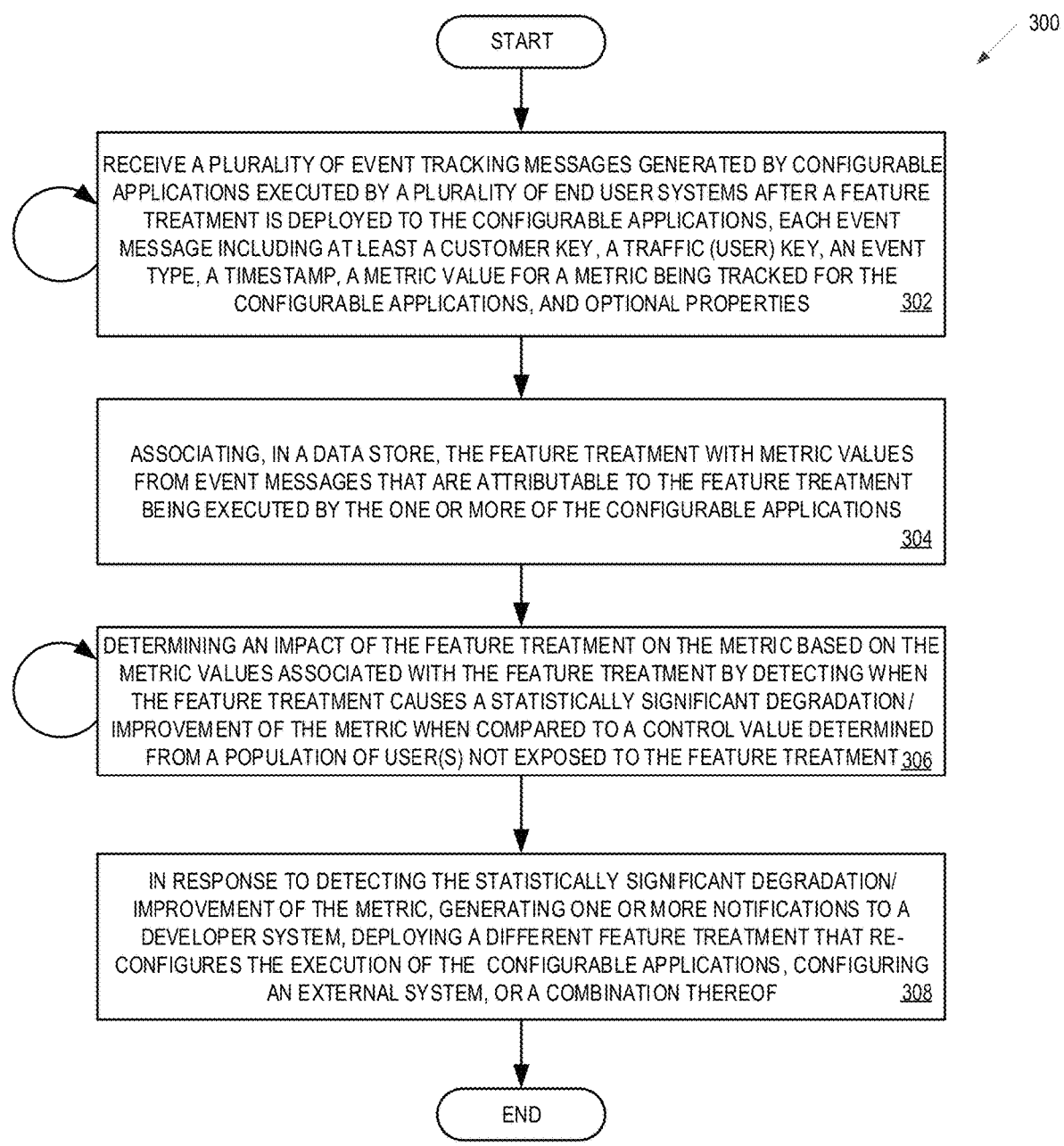
FIG. 3 is a flow diagram of one embodiment of a method for providing real time application anomaly detection and remediation.

FIG. 3 is a flow diagram of one embodiment of a method for providing real time application anomaly detection and remediation. The method 300 is performed by processing logic that may comprise hardware (circuitry, dedicated logic, etc.), software (such as is run on a general purpose computer system or a dedicated machine), firmware, or a combination. In one embodiment, the method 300 is performed by an application monitoring and configuration server (e.g., application monitoring and configuration server 110, 210, or 310).

Referring to FIG. 3, processing logic begins by receiving a plurality of event tracking messages generated by configurable applications executed by a plurality of end user systems after a feature treatment is deployed to the configurable applications, where each event message includes at least a customer key, traffic (user) key, an event type, a timestamp, a metric value of a metric being tracked for the configurable applications, and optional properties (processing block 302). In embodiments, the event tracking messages are generated within an application (e.g. API-based messaging, SDK track( ) method calls, etc.), to report metrics associated with the tracking. Processing logic continues to receive these reporting messages each time an application is exposed to a feature, uses a feature, etc. as configured by a developer for reporting feature exposure, usage, and/or metrics of interest to the developer. For example, in embodiments, the tracking messages may be placed behind configurable features as well as in other locations in applications, so that tracking messages indicate exposure to such features (e.g. a metric being the number of times an end user is exposed to the feature), a metric value generated for tracking purposes (e.g. a time on page value, a page load time value, click counts, etc.), or a combination of such metrics generated in one or more tracking messages generated from various location(s) in an application.

Processing logic then associates, in a data store, the feature treatment with metric values from event messages that are attributable to the feature treatment being executed by the one or more configurable applications (processing block 304). For example, based on data within the messages, time of message generation, user key, customer key, a time when a configuration, rollout, or experiment occurs, or a combination of such features etc., processing logic attributes an event tracking message to feature treatment variations.

Processing logic determines an impact of the feature treatment on the metric based on the metric values associated with the feature treatment by detecting when the feature treatment causes a statistically significant degradation/improvement of the metric when compared to a control value determined from a population of user(s) not exposed to the feature treatment (processing block 306). As discussed above, processing logic performs a statistical analysis of metrics from tracking messages in a population that was exposed to a treatment variation and a statistically consistent population that was not exposed to a treatment variation (e.g., a control group having one or more of the same demographic traits). Then, the metrics reported in the tracking messages are used during, for example, a one-tailed test to determine with statistical significance when the metric associated and attributed to a feature treatment variation is statistically likely to have degraded or improved by a threshold amount. The parameters of the one-tailed test may be configured by a developer of the application for which the analysis is being performed (see, e.g., FIGS. 7A and 7B). For example, processing logic may utilize a metric defined by the developer (e.g. page load time, click count total, average time on page per visit, etc.), a desired impact on the metric such that movement in the opposite direction (e.g. direction of degradation or direction of improvement) is indicative of a feature treatment having an unwanted or desired impact on the configurable application, a threshold (e.g., an acceptable amount that the metric can move in the direction of degradation or improvement, such as a relative amount or an absolute amount, for example X+10% or X+100 ms respectively), a confidence level (e.g., 90%, 95%, 99%, etc. confidence when firing alerts and/or automatic configurations), as well as default values associated with baseline values (e.g. from baseline treatments) or developer defined default values for such metrics.

Processing logic then uses the configurations when performing the one tailed test. For example, the null hypothesis may be set to a metric within the configured threshold value, the alternative hypothesis may be set to the metric value satisfying or exceeding the threshold value in the direction of degradation or improvement (e.g., degradation satisfying the configured threshold or improvement satisfying the configured threshold), and the p-value for the one-tailed test being 10%, 5%, 1%, etc. corresponding to the configured confidence level. Processing logic then analyzes the metrics from the attributed events for the different populations to determine when the null hypothesis can be disproved within the p-value threshold.

In embodiments, processing logic periodically performs the statistical analysis. However, in embodiments, the period between each statistical analysis increases until a maximum number of statistical analyses are performed. In embodiments, the p-value threshold for individual analyses is selected by processing logic so that an accumulated error resulting from the statistical analyses does not exceed that defined by the developer set confidence level. In embodiments, the p-value thresholds for each individual analysis are selected using group sequential testing techniques designed to maximize the statistical power of interim statistical analyses whilst ensuring the accumulated error rate is, at most, that defined by the developer set confidence level. Furthermore, to enable faster metric degradation or improvement detection, and to minimize potential end-user exposure, processing logic performs the periodic test at an initial time near feature treatment variation deployment (e.g., 30 seconds, 1 minute, 5 minutes, etc. after rollout), and then performs further analyses at increasing periods thereafter.

In embodiments, the schedules for the analyses are tailored for the specific test by taking in to account the configurations of the test, such as the developer set confidence level and the degradation/improvement threshold, as well as the expected magnitude or size of distinct identifiers (i.e., a number of users) for the applications being monitored, which may be provided either by user input or through a prediction estimated from initial, or past, observations. In cases of a low size of distinct identifiers, the schedules can be tailored to avoid analyses being performed when it is not statistically possible for a significant degradation/improvement to be detected, thereby avoiding the costs of non-valuable analyses, both in terms of processing costs and reducing the statistical power of subsequent analyses. Additionally, when the increase in the number of distinct identifiers over time is non-linear, as would be expected for a test on an application which experiences frequently returning visitors for example, the schedule can, when desired, be tailored such that the periods between the analyses represent the desired development (e.g. linear, logarithmic etc.) in the number of distinct identifiers rather than periods of time.

In embodiments, the analysis schedule may end prematurely if the metric is deemed "safe". This determination may occur when the entire confidence interval (with the level of confidence defined by the developer set confidence threshold) lies entirely on one side of either zero, the degradation/improvement threshold, or a separate developer configured safety threshold. When a degradation is defined as a decrease/increase in the metric value (and similarly for improvement), the confidence interval must lie entirely above/below the boundaries discussed above respectively. When using group sequential testing techniques, the analysis can be configured to define an efficacy boundary for each of the interim analyses, which, once crossed, defines the metric as "safe" and allows for the analysis schedule to be stopped.

Processing logic, in response to detecting the statistically significant degradation or improvement of the metric, generates one or more notifications to a developer system, deploying a different feature treatment that re-configures the execution of the configurable applications, configures an external system, or a combination thereof (processing block 308). In embodiments, the notification may be an email message, instant message, text message, voice message, or other alert message that includes information about the alert, such as metric to which the alert belongs, degradation amount detected, when the degradation was detected, etc. Furthermore, the alert message may link to a webpage or other user interface to be configured by processing logic (see, e.g., FIG. 8). For example, the webpage or other user interface may display relevant information for deciding how to respond to the alert, such as impact on a metric, comparison to a control group, error margin, etc.

In embodiments, processing logic may also or alternatively configure an application for which a metric degradation has been detected with a statistical significance, as discussed above. That is, when a metric degraded beyond a threshold amount, satisfies a confidence interval, no response from a user of a developer is received within a preset time period, or a combination thereof, processing logic may roll back or kill the feature treatment variation for which the degradation was detected. This enables processing logic to automatically configure the misbehaving application to prevent further end user exposure to an application feature treatment causing an undesired user experience. Similarly, for applications in which improvement is detected, other applications may automatically be given the treatment(s) determined to be causing the improvements.

Figure 4:
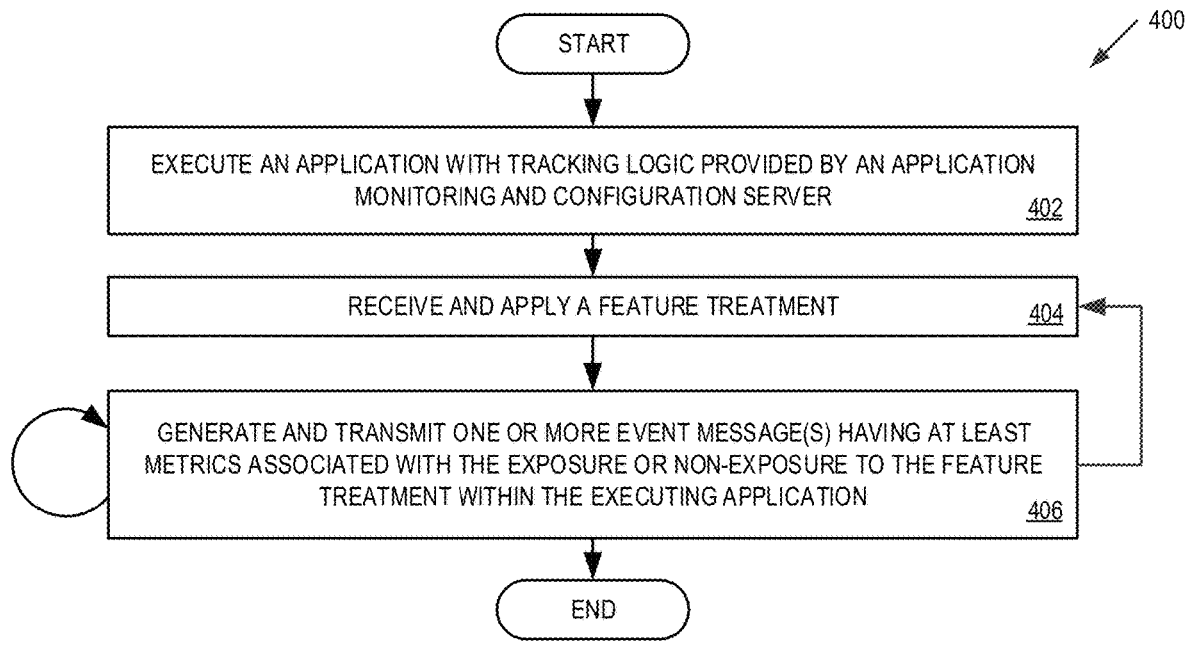
FIG. 4 is a flow diagram of one embodiment of a method for providing event messages from an application to an application monitoring and configuration server.

FIG. 4 is a flow diagram of one embodiment of a method 400 for providing event messages from an application to an application monitoring and configuration server. The method 400 is performed by processing logic that may comprise hardware (circuitry, dedicated logic, etc.), software (such as is run on a general purpose computer system or a dedicated machine), firmware, or a combination. In one embodiment, the method 400 may be performed by a configurable application running on a user system, such as configurable application 135-1 through 135-N and 275.

Referring to FIG. 4, processing logic begins by executing an application with tracking logic provided by an application monitoring and configuration server (processing block 402). For example, application monitoring and configuration server 110 or 210 may provide an API, SDK, etc. to an application developer system (e.g., application developer system 120 or 250), which integrates tracking method calls within relevant portions of one or more software applications to be tracked. For example, the tracking calls may be integrated into application features treatments, where specific treatments are conditionally executed within the configurable application. As another example, tracking calls may be integrated into other software systems, such as membership systems, CRM systems, etc. that are relevant to a feature treatment that is the subject of an experiment. In yet another example, tracking calls may be integrated into several systems, that are part of configurable applications and external systems, where the track calls are integrated into features of relevant that are related to configurable application feature application and application developer system 250 objectives Processing logic receives and applies a feature treatment (processing block 404). For example, processing logic may receive treatments from an application monitoring and configuration server (110 or 210) specifying what feature, treatment values, etc. are to be applied by the application tracking logic.

Processing logic then generates and transmits one or more event messages having at least metrics associated with the exposure or non-exposure to the feature treatment within the executing application (processing block 406). In one embodiment, event messages are generated by executing a tracking method call (e.g. track(customer_ID, traffic_ID, event-ID, metric value, and a timestamp). The date contained within the track( ) call and transmitted by processing logic to application monitoring and configuration server indicates that a feature of interest within an application or external system was accessed by a user of an end user system. Then, when the data, such as customer ID, traffic/user ID, metric value, event type, timestamps, etc. are attributed to feature deployment and/or rollout based on timing, as discussed above, rich and feature full insights are gained as to whether a treatment applied to a configurable application used by one or more users (e.g., those specified in an experiment rule), and statistical analysis can be performed to determine to a statistical significance when a feature is having a negative impact on an application. Then, the application monitoring and configuration server may take appropriate actions, such as generating notification, automatically configuring an application, or a combination thereof as discussed herein.

In another embodiment, event messages are also generated by processing logic of other systems similar to that discussed above in FIG. 4. Such other systems may call a public API (e.g., of a developer system) to extend the generation of event messages to those other systems (e.g. CRM systems, merchant systems, etc.) to provide additional sources of data to the application monitoring and configuration server. In embodiments, event messages generated by applications and other systems may be combined and/or attributed to feature treatments, as discussed herein.

Figure 5:
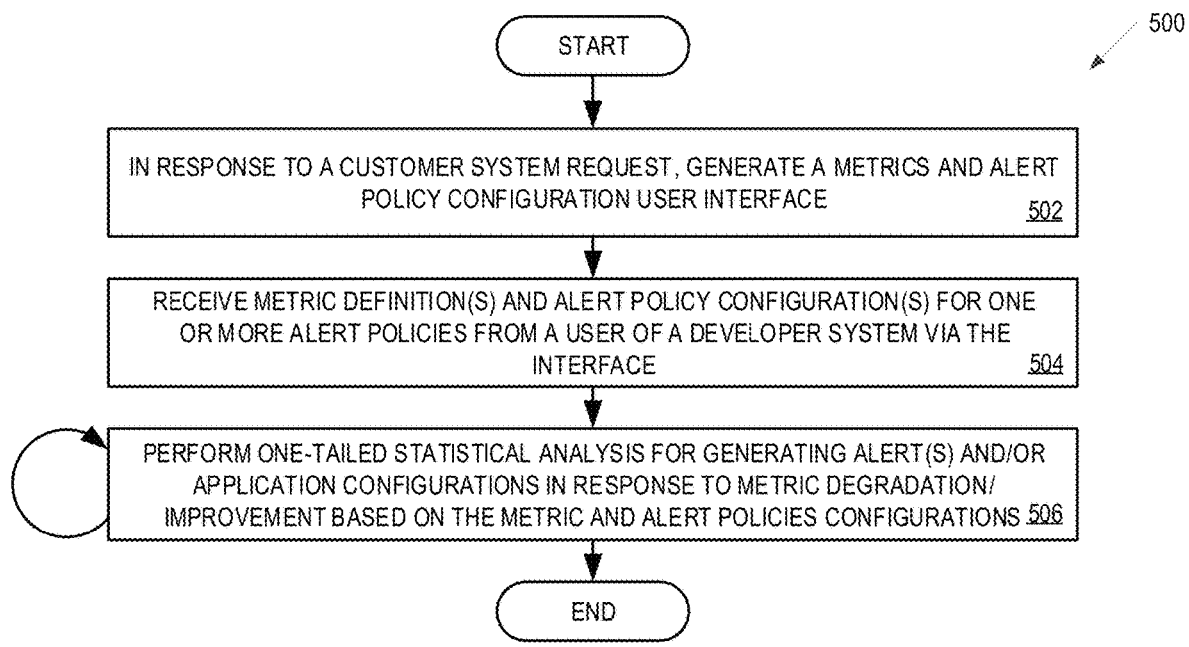
FIG. 5 is a flow diagram of one embodiment of a method for an application monitoring and configuration server enabling configuration of application anomaly detection characteristics.

FIG. 5 is a flow diagram of one embodiment of a method 500 for an application monitoring and configuration server enabling configuration of application anomaly detection characteristics. The method 500 is performed by processing logic that may comprise hardware (circuitry, dedicated logic, etc.), software (such as is run on a general purpose computer system or a dedicated machine), firmware, or a combination. In one embodiment, the method 500 is performed by an application monitoring and configuration server (e.g., application monitoring and configuration server 110, 210, or 310).

Referring to FIG. 5, processing logic begins by, in response to a customer system request, generating a metrics and alert policy configuration user interface (processing block 502). In embodiments, one or more graphical user interfaces such as those illustrated in FIGS. 7A and 7B may be generated. The GUIs, in embodiments, may be web page user interfaces. In another embodiment, the GUIs may be application based, in which processing logic transmits data to the application to populate the GUI.

In either embodiment, processing logic receives metric definition(s) and alert policy configuration(s) for one or more alert policies from a user of a developer system via the interface (processing block 504). As discussed herein, the metrics, degradation thresholds, improvement thresholds, confidence levels, alert policies, etc. may be configured by users of a developer system to fine tune when alerts (e.g., developer notifications), automatic application configurations (e.g., rolling back or killing misbehaving feature treatments, configuring additional systems with features causing desired improvements, etc.), and/or automatic configuration of third party or external systems (e.g., configuring remote computing resources used by configurable applications, triggering actions of a software developer system to track errors and/or bugs in an application, etc.) occur. Processing logic then performs a one-tailed statistical analysis for generating alert(s) and/or application configurations in response to metric degradation/improvement based on the metric and alert policies configurations (processing block 506).

Figure 6:
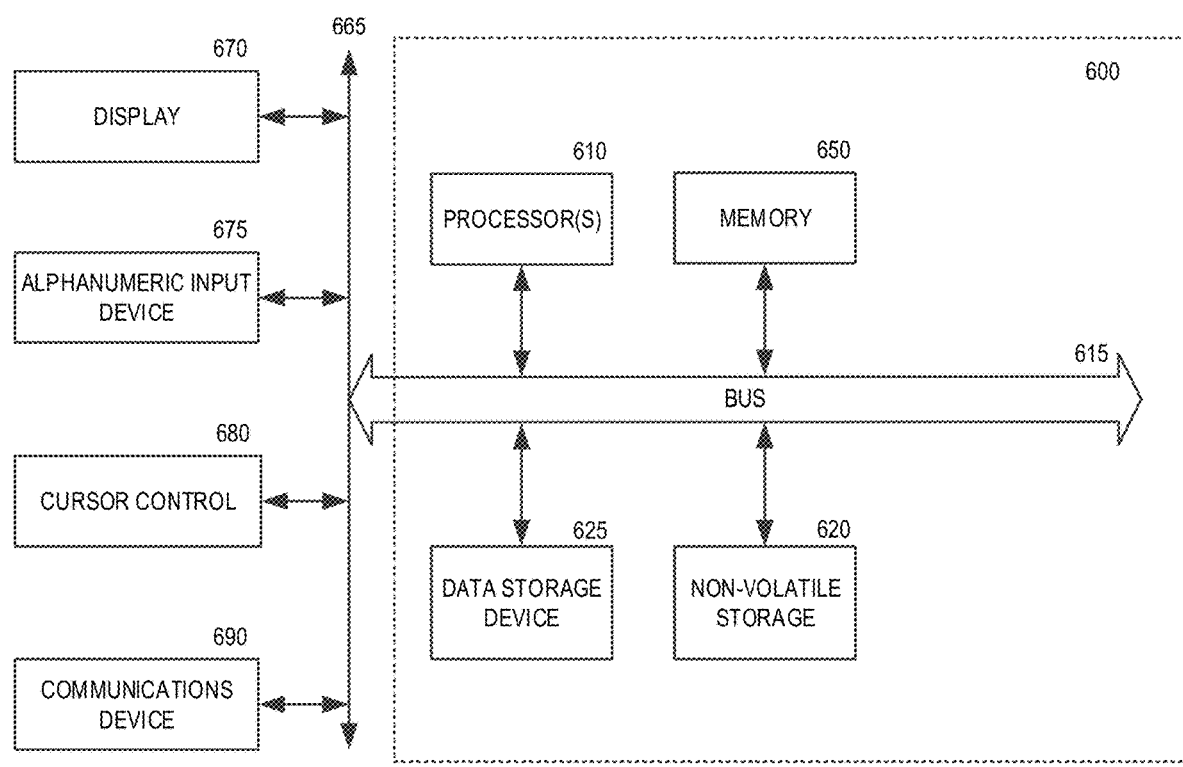
FIG. 6 is one embodiment of a computer system that may be used in accordance with an embodiment of the invention.

FIG. 6 is one embodiment of a computer system that may be used with the present invention, for example, to implement application monitoring and configuration server 110. It will be apparent to those of ordinary skill in the art, however that other alternative systems of various system architectures may also be used.

The data processing system illustrated in FIG. 6 includes a bus or other internal communication means 615 for communicating information, and at least one processor 610 coupled to the bus 615 for processing information. The system further comprises a random access memory (RAM) or other volatile storage device 650 (referred to as memory), coupled to bus 615 for storing information and instructions to be executed by processor 610. Main memory 650 also may be used for storing temporary variables or other intermediate information during execution of instructions by processor 610. The system also comprises a read only memory (ROM) and/or static storage device 620 coupled to bus 615 for storing static information and instructions for processor 610, and a data storage device 625 such as a magnetic disk or optical disk and its corresponding disk drive. Data storage device 625 is coupled to bus 615 for storing information and instructions.

The system may further be coupled to a display device 670, such as a light emitting diode (LED), a liquid crystal display (LCD), or other display, coupled to bus 615 through bus 665 for displaying information to a computer user. An alphanumeric input device 675, including alphanumeric and other keys, may also be coupled to bus 615 through bus 665 for communicating information and command selections to processor 610. An additional user input device is cursor control device 680, such as a touchpad, mouse, a trackball, stylus, or cursor direction keys coupled to bus 615 through bus 665 for communicating direction information and command selections to processor 610, and for controlling cursor movement on display device 670.

Another device, which may optionally be coupled to computer system 600, is a communication device 690 for accessing other nodes of a distributed system via a network. The communication device 690 may include any of a number of commercially available networking peripheral devices such as those used for coupling to an Ethernet, token ring, Internet, or wide area network. The communication device 690 may further be a null-modem connection, or any other mechanism that provides connectivity between the computer system 600 and the outside world. Note that any or all of the components of this system illustrated in FIG. 6 and associated hardware may be used in various embodiments of the present invention.

It will be appreciated by those of ordinary skill in the art that any configuration of the system may be used for various purposes according to the particular implementation. The control logic or software implementing the present invention can be stored in main memory 650, mass storage device 625, or other storage medium locally or remotely accessible to processor 610.

It will be apparent to those of ordinary skill in the art that the system, method, and process described herein can be implemented as software stored in main memory 650 or read only memory 620 and executed by processor 610. This control logic or software may also be resident on an article of manufacture comprising a non-transitory computer readable medium having computer readable program code embodied therein and being readable by the mass storage device 625 and for causing the processor 610 to operate in accordance with the methods and teachings herein.

The present invention may also be embodied in a handheld or portable device containing a subset of the computer hardware components described above. For example, the handheld device may be configured to contain only the bus 615, the processor 610, and memory 650 and/or 625. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of the present invention for such a device would be apparent to one of ordinary skill in the art given the disclosure of the present invention as provided herein.

The present invention may also be embodied in a special purpose appliance including a subset of the computer hardware components described above. For example, the appliance may include a processor 610, a data storage device 625, a bus 615, and memory 650, and only rudimentary communications mechanisms, such as a small touch-screen that permits the user to communicate in a basic manner with the device. In general, the more special-purpose the device is, the fewer of the elements need be present for the device to function.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

We claim:

1. A method for application anomaly detection and remediation, comprising:

receiving, by a server computer system, a set of parameters from a developer system, wherein the one or more parameters comprise the metric, a maximum length of time over which the metric should be monitored for degradations, a desired impact of the feature treatment on the metric, and an amount that the metric can deviate from the control value of the metric in a direction opposite a direction of the desired impact, wherein receiving the set of parameters further comprises receiving a confidence level parameter from the developer system;

receiving, by the server computer system, a plurality of event tracking messages generated by configurable applications executed by a first plurality of end user systems after a feature treatment is deployed to the configurable applications;

associating, in a data store at the server computer system, the feature treatment with values of a metric from the event messages that are attributable to the feature treatment being executed by the one or more configurable applications, wherein the metric is a performance indicator associated with the execution of the configurable application;

determining, by the server computer system, an impact of the feature treatment on the metric based on the values of the metric that are associated with the feature treatment comprising detecting when the feature treatment causes a statistically significant degradation of the metric based on the received set of parameters when compared to a control value of the metric determined from a second plurality of end user systems that are not exposed to the feature treatment comprising: performing a one-tailed statistical analysis of the impact of the feature treatment on the metric using the values of the metric from the event tracking messages generated by the first plurality of end user systems, and the control value of the metric determined from the second plurality of end user systems; and using the confidence level parameter to calculate a p-value threshold to be used in each one-tailed statistical analysis of the impact of the feature treatment on the metric which limits an accumulated error rate to a desired level as defined by the confidence level parameter; and in response to detecting the statistically significant degradation of the metric, generating and transmitting one or more notifications to one or more users responsible for development of the configurable applications, deploying a different feature treatment that re-configures the execution of the configurable applications of end user systems that have the feature treatment, or a combination thereof.

2. The method of claim 1, wherein the one-tailed statistical analysis is performed periodically a maximum number of times, and wherein thresholds for defining statistical significance for each individual analysis are determined so that an accumulated error resulting from performing the statistical analysis the maximum number of times does not exceed an error rate defined by a developer set confidence level.

3. The method of claim 1, further comprising:
generating a graphical user interface for configuration of one or more parameters used for detecting when the feature treatment causes the statistically significant degradation of the metric;
providing the graphical user interface to a user of a developer system, the developer system associated with the development and distribution of the configurable applications to end users of the developer system; and
receiving the set of parameters from the developer system via the graphical user interface.

4. The method of claim 1, wherein processing logic determines the second plurality of end user systems from all potential end user systems based on shared demographic information with the plurality of end user systems, wherein the shared demographic information results in statistically consistent sets of users from the plurality of end user systems, and wherein the shared demographic information comprises users of the first plurality of end user systems and users of the second plurality of end user systems having a same age, a same geographical region, a same gender, a same income, a same education level, a same end user device type, a same end user operating system, or a combination thereof.

5. The method of claim 1, wherein the different feature treatment that re-configures the execution of the configurable applications of end user systems that have the feature treatment is deployed to one or more end user systems that have received the feature treatment and have not yet interacted with the feature having the treatment within a configurable application.

6. The method of claim 1, further comprising:
in response to detecting the statistically significant degradation of the metric, generating and transmitting a notification to a user responsible for development of the configurable applications;
waiting a set amount of time for a response of the user to the notification, wherein the response at least dismisses the notification or includes a re-configuration of the feature treatment; and
when a response is not received upon expiration of the set amount of time, automatically deploying the different feature treatment that re-configures the execution of the configurable applications of end user systems that have the feature treatment.

7. The method of claim 1, wherein the notification comprises an email message, a text message, an instant messaging system message, a social networking system message, a voice message, or a combination thereof, wherein each notification comprises a link that resolves at webpage for displaying the notification and data used by the server computer system when detecting when the feature treatment causes a statistically significant degradation of the metric, and wherein a specification of the one or more users to receive the one or more notifications are received from a user of a developer system.

8. A method for application anomaly detection and remediation, comprising:
receiving, by a server computer system, a set of parameters from a developer system, wherein the one or more parameters comprise the metric, a maximum length of time over which the metric should be monitored for degradations, a desired impact of the feature treatment on the metric, and an amount that the metric can deviate from the control value of the metric in a direction opposite a direction of the desired impact;

receiving, by the server computer system, a plurality of event tracking messages generated by configurable applications executed by a first plurality of end user systems after a feature treatment is deployed to the configurable applications;

associating, in a data store at the server computer system, the feature treatment with values of a metric from the event messages that are attributable to the feature treatment being executed by the one or more configurable applications, wherein the metric is a performance indicator associated with the execution of the configurable application;

determining, by the server computer system, an impact of the feature treatment on the metric based on the values of the metric that are associated with the feature treatment comprising detecting when the feature treatment causes a statistically significant degradation of the metric based on the received set of parameters when compared to a control value of the metric determined from a second plurality of end user systems that are not exposed to the feature treatment by performing a one-tailed statistical analysis of the impact of the feature treatment on the metric using the values of the metric from the event tracking messages generated by the first plurality of end user systems, and the control value of the metric determined from the second plurality of end user systems, wherein the one-tailed statistical analysis is performed periodically with an increasing length of time between each successive one-tailed statistical analysis performed; and in response to detecting the statistically significant degradation of the metric, generating and transmitting one or more notifications to one or more users responsible for development of the configurable applications, deploying a different feature treatment that re-configures the execution of the configurable applications of end user systems that have the feature treatment, or a combination thereof.

9. A method for application anomaly detection and remediation, comprising:

receiving, by a server computer system, a set of parameters from a developer system, wherein the one or more parameters comprise the metric, a maximum length of time over which the metric should be monitored for degradations, a desired impact of the feature treatment on the metric, and an amount that the metric can deviate from the control value of the metric in a direction opposite a direction of the desired impact;

receiving a second set of parameters from the developer system, wherein the second set of parameters define a higher confidence level to be used in the one-tailed statistical analysis, a different amount that the metric can deviate from the control value of the metric, or a combination thereof;

receiving, by the server computer system, a plurality of event tracking messages generated by configurable applications executed by a first plurality of end user systems after a feature treatment is deployed to the configurable applications;

associating, in a data store at the server computer system, the feature treatment with values of a metric from the event messages that are attributable to the feature treatment being executed by the one or more configurable applications, wherein the metric is a performance indicator associated with the execution of the configurable application;

determining, by the server computer system, an impact of the feature treatment on the metric based on the values of the metric that are associated with the feature treatment comprising detecting when the feature treatment causes a statistically significant degradation of the metric based on the received set of parameters or the received second set of parameters when compared to a control value of the metric determined from a second plurality of end user systems that are not exposed to the feature treatment by performing a one-tailed statistical analysis of the impact of the feature treatment on the metric using the values of the metric from the event tracking messages generated by the first plurality of end user systems, and the control value of the metric determined from the second plurality of end user systems, wherein the determining further comprises:

in response to detecting when the feature treatment causes the statistically significant degradation of the metric based on the received set of parameters, generating and transmitting the one or more notifications to the one or more users responsible for development of the configurable applications, and in response to detecting when the feature treatment causes the statistically significant degradation of the metric based on the received set second of parameters, deploying the different feature treatment that re-configures the execution of the configurable applications of end user systems that have the feature treatment.

10. A non-transitory computer readable storage medium including instructions that, when executed by a processor, cause the processor to perform operations for application anomaly detection and remediation, the operations comprising:

receiving, by a server computer system, a set of parameters from a developer system, wherein the one or more parameters comprise the metric, a maximum length of time over which the metric should be monitored for degradations, a desired impact of the feature treatment on the metric, and an amount that the metric can deviate from the control value of the metric in a direction opposite a direction of the desired impact, wherein receiving the set of parameters further comprises receiving a confidence level parameter from the developer system;

receiving, by the server computer system, a plurality of event tracking messages generated by configurable applications executed by a first plurality of end user systems after a feature treatment is deployed to the configurable applications;

associating, in a data store at the server computer system, the feature treatment with values of a metric from the event messages that are attributable to the feature treatment being executed by the one or more configurable applications, wherein the metric is a performance indicator associated with the execution of the configurable application;

determining, by the server computer system, an impact of the feature treatment on the metric based on the values of the metric that are associated with the feature treatment comprising detecting when the feature treatment causes a statistically significant degradation of the metric based on the received set of parameters when compared to a control value of the metric determined from a second plurality of end user systems that are not exposed to the feature treatment comprising: performing a one-tailed statistical analysis of the impact of the feature treatment on the metric using the values of the metric from the event tracking messages generated by the first plurality of end user systems, and the control value of the metric determined from the second plurality of end user systems; and using the confidence level parameter to calculate a p-value threshold to be used in each one-tailed statistical analysis of the impact of the feature treatment on the metric which limits an accumulated error rate to a desired level as defined by the confidence level parameter; and in response to detecting the statistically significant degradation of the metric, generating and transmitting one or more notifications to one or more users responsible for development of the configurable applications, deploying a different feature treatment that re-configures the execution of the configurable applications of end user systems that have the feature treatment, or a combination thereof.

11. The non-transitory computer readable storage medium of claim 10, wherein the one-tailed statistical analysis is performed periodically a maximum number of times, and wherein thresholds for defining statistical significance for each individual analysis are determined so that an accumulated error resulting from performing the statistical analysis the maximum number of times does not exceed an error rate defined by a developer set confidence level.

12. The non-transitory computer readable storage medium of claim 10, wherein the one-tailed statistical analysis is performed periodically with an increasing length of time between each successive one-tailed statistical analysis performed.

13. The non-transitory computer readable storage medium of claim 10, further comprising:
receiving a second set of parameters from the developer system, wherein the second set of parameters define a higher confidence level to be used in the one-tailed statistical analysis, a different amount that the metric can deviate from the control value of the metric, or a combination thereof;
in response to detecting when the feature treatment causes the statistically significant degradation of the metric based on the received set of parameters, generating and transmitting the one or more notifications to the one or more users responsible for development of the configurable applications; and
in response to detecting when the feature treatment causes the statistically significant degradation of the metric based on the received set second of parameters, deploying the different feature treatment that re-configures the execution of the configurable applications of end user systems that have the feature treatment.

14. The non-transitory computer readable storage medium of claim 10, further comprising:
generating a graphical user interface for configuration of one or more parameters used for detecting when the feature treatment causes the statistically significant degradation of the metric;
providing the graphical user interface to a user of a developer system, the developer system associated with the development and distribution of the configurable applications to end users of the developer system; and
receiving the set of parameters from the developer system via the graphical user interface.

15. The non-transitory computer readable storage medium of claim 10, wherein processing logic determines the second plurality of end user systems from all potential end user systems based on shared demographic information with the plurality of end user systems, wherein the shared demographic information results in statistically consistent sets of users from the plurality of end user systems, and wherein the shared demographic information comprises users of the first plurality of end user systems and users of the second plurality of end user systems having a same age, a same geographical region, a same gender, a same income, a same education level, a same end user device type, a same end user operating system, or a combination thereof.

16. The non-transitory computer readable storage medium of claim 10, wherein the different feature treatment that re-configures the execution of the configurable applications of end user systems that have the feature treatment is deployed to one or more end user systems that have received the feature treatment and have not yet interacted with the feature having the treatment within a configurable application.

17. The non-transitory computer readable storage medium of claim 10, further comprising:
in response to detecting the statistically significant degradation of the metric, generating and transmitting a notification to a user responsible for development of the configurable applications;
waiting a set amount of time for a response of the user to the notification, wherein the response at least dismisses the notification or includes a re-configuration of the feature treatment; and
when a response is not received upon expiration of the set amount of time, automatically deploying the different feature treatment that re-configures the execution of the configurable applications of end user systems that have the feature treatment.

18. The non-transitory computer readable storage medium of claim 10, wherein the notification comprises an email message, a text message, an instant messaging system message, a social networking system message, a voice message, or a combination thereof, wherein each notification comprises a link that resolves at webpage for displaying the notification and data used by the server computer system when detecting when the feature treatment causes a statistically significant degradation of the metric, and wherein a specification of the one or more users to receive the one or more notifications are received from a user of a developer system.

19. A system for application anomaly detection and remediation, comprising:
a memory to store event tracking messages; and
a processing system coupled with the memory configured to:
receive a set of parameters from a developer system, wherein the one or more parameters comprise the metric, a maximum length of time over which the metric should be monitored for degradations, a desired impact of the feature treatment on the metric, and an amount that the metric can deviate from the control value of the metric in a direction opposite a direction of the desired impact, wherein the receipt of the set of parameters further comprises receipt of a confidence level parameter from the developer system,
receive a plurality of event tracking messages generated by configurable applications executed by a first plurality of end user systems after a feature treatment is deployed to the configurable applications,
associate, in the memory, the feature treatment with values of a metric from the event messages that are attributable to the feature treatment being executed by the one or more configurable applications, wherein the metric is a performance indicator associated with the execution of the configurable application,
determine an impact of the feature treatment on the metric based on the values of the metric that are associated with the feature treatment comprising detecting when the feature treatment causes a statistically significant degradation of the metric based on the received set of parameters when compared to a control value of the metric determined from a second plurality of end user systems that are not exposed to the feature treatment comprising the processing system further configured to: perform a one-tailed statistical analysis of the impact of the feature treatment on the metric using the values of the metric from the event tracking messages generated by the first plurality of end user systems, and the control value of the metric determined from the second plurality of end user systems; and use the confidence level parameter to calculate a p-value threshold to be used in each one-tailed statistical analysis of the impact of the feature treatment on the metric which limits an accumulated error rate to a desired level as defined by the confidence level parameter, and in response to detecting the statistically significant degradation of the metric, generate and transmit one or more notifications to one or more users responsible for development of the configurable applications, deploy a different feature treatment that reconfigures the execution of the configurable applications of end user systems that have the feature treatment, or a combination thereof.

\* \* \* \* \*